Feb. 17, 1931.  S. B. WELCOME ET AL  1,792,950
ORIFICE FITTING
Filed Aug. 14, 1929
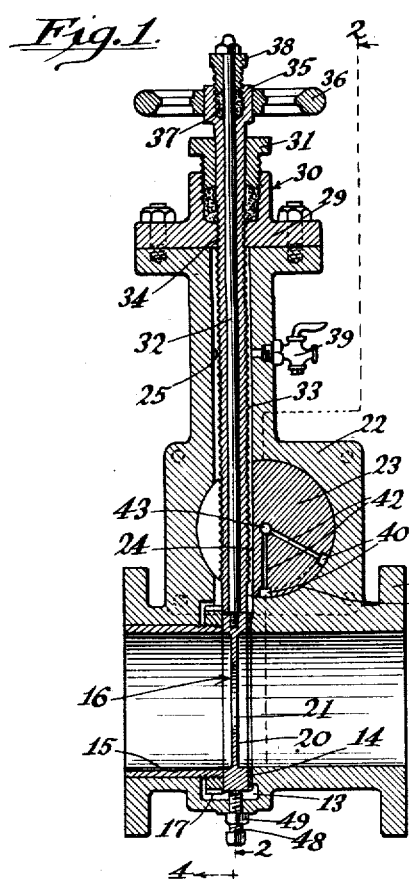
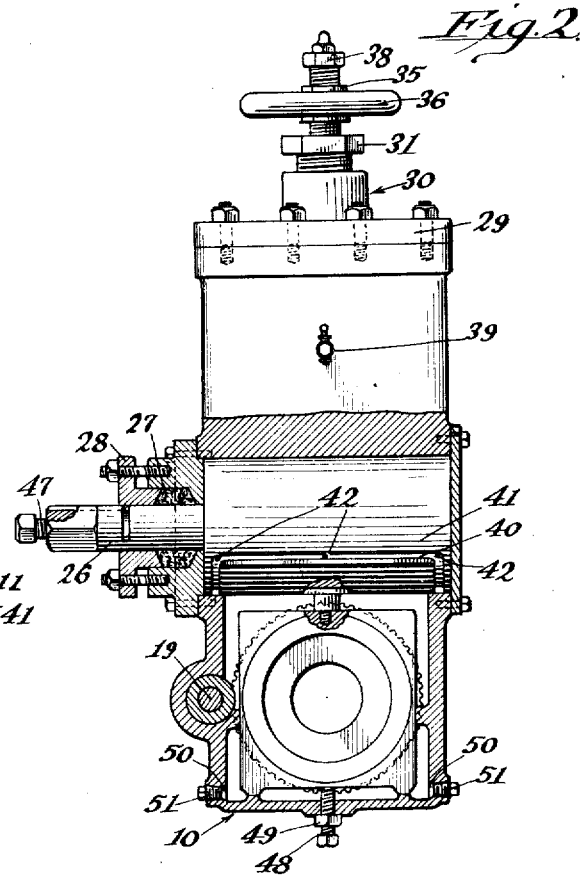
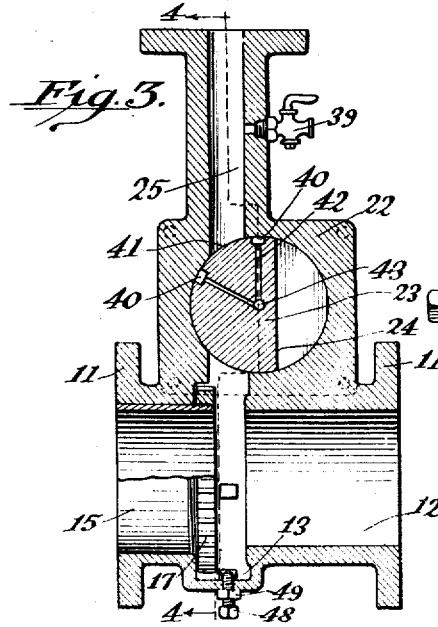
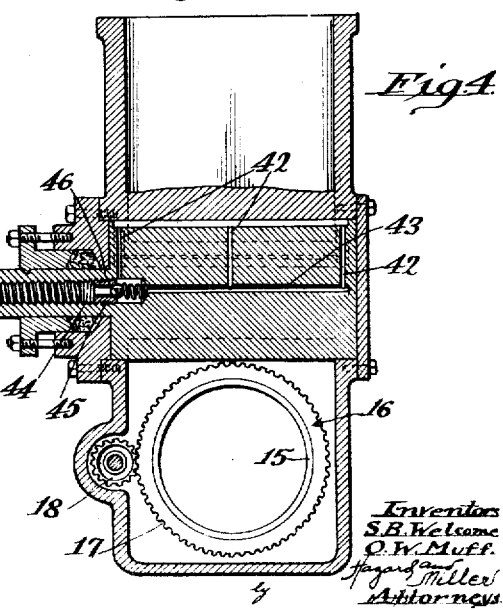

Patented Feb. 17, 1931

1,792,950

UNITED STATES PATENT OFFICE

SOLON B. WELCOME AND OLIVER W. MUFF, OF LOS ANGELES, CALIFORNIA, ASSIGNORS TO COMMERCIAL IRON WORKS OF LOS ANGELES, OF LOS ANGELES, CALIFORNIA, A CORPORATION OF CALIFORNIA

ORIFICE FITTING

Application filed August 14, 1929. Serial No. 385,913.

This invention relates to improvements in orifice fittings and may be considered as an improvement over the construction disclosed in our prior application Serial No. 336,204, filed January 30, 1929.

An object of the present invention is to provide an improved orifice fitting having a body with a transversely bisected bore in which there is a removable orifice plate, which orifice plate can be removed from the bore into a laterally accessible chamber, and to provide a construction for moving the orifice plate to and from the chamber which will enable the orifice plate to be kept under control throughout its entire movement. It has been experienced heretofore that where orifice fittings of this type are used in gas lines wherein the gas is under high pressure, that after the orifice plate has been loosened and started on its movement toward the chamber, that the pressure effective on the orifice plate will force it into the chamber with a great deal of force and high velocity. The positioning mechanism gets out of control and is very apt to endanger the operator. It is, therefore, an object of the invention to provide a construction which will keep the orifice plate under control throughout its entire movement so that the operator will not be endangered thereby.

It is another object of the invention to provide an orifice fitting having a body in which there is a transversely bisected bore and having an orifice plate receivable in the bisection, or movable therefrom into a chamber which can be shut off from the bore to permit substitution of the orifice plate and to provide means for releasing pressure in the chamber so that the pressure in the chamber can be reduced to atmospheric pressure prior to opening the chamber to substitute one orifice plate for the other.

A further object of the invention is to provide an improved valve structure which closes off the bore in the body from the chamber and which is of novel construction in that a fluid is employed to force the valve into closed or tight seating position and also to form a liquid seal, effectively preventing the escape of gas from the bore in the body into the chamber.

With the foregoing and other objects in view, which will be made manifest in the following detailed description, and specifically pointed out in the appended claims, reference is had to the accompanying drawing for an illustrative embodiment of the invention, wherein:

Fig. 1 is a vertical section through the improved orifice fitting.

Fig. 2 is a sectional view taken substantially upon the line 2—2 upon Fig. 1.

Fig. 3 is a partial view similar to Fig. 1, illustrating the orifice fitting in that position wherein the chamber is closed off from the bore in the body and the orifice plate has been removed for substitution purposes.

Fig. 4 is a view taken substantially upon the line 4—4 upon Fig. 3.

Referring to the accompanying drawings wherein similar reference characters designate similar parts throughout, the improved orifice fitting comprises a body 10 having flanges 11 to enable the body to be incorporated in a pipe line. The body 10 has a bore 12 formed therein, in which there is a transverse bisection 13, on one side of which is formed a seat 14. In one end of the bore 12 there is placed a sleeve 15, which is stationary and has its inner end threaded to receive a threaded annulus 16. The annulus 16 has gear teeth 17 formed on its periphery which are in mesh with a pinion 18 on a longitudinal spindle 19. By rotating the spindle 19 the annulus 16 can be revolved and by reason of its threaded engagement with the sleeve 15 it can be moved toward or away from the seat 14. An orifice plate 20, having an orifice 21 of carefully determined size, is removably positioned in the bisection 13 and when in position in the bisection it may be forced tightly against the seat 14 by the annulus 16.

The body 10 is provided, above the bore 12, with a cylindrical enlargement 22, the axis of which is off-set from the bisection, and a rotatable plug cock or valve closure 23 is rotatable therein. This plug cock or valve closure has a side removed, as indicated at 24, to enable the orifice plate 20 to be moved therethrough into a chamber 25 formed in the body. The plug cock 23 is normally in the open position shown in Fig. 1 but can be rotated therefrom into a closed position by means of a stem 26 having a squared end and around which there is disposed packing 27 compressed by a gland 28. The top of the chamber 25 is closed by a cap 29, which is provided with a stuffing box 30 in which packing is compressed by a gland 31.

A positioning rod 32 extends downwardly through the cap 29, through the chamber 25, through the open side of the plug cock 23, and is threaded or otherwise detachably secured to the top of the orifice plate 20. This positioning rod is surrounded by a threaded sleeve 33 and the threaded sleeve has threads throughout substantially its entire length. These threads, which are formed on the sleeve, mesh with complementary threads, indicated at 34, which are formed in the cap 29 immediately below the stuffing box 30. The upper end of the sleeve is enlarged, as indicated at 35, which enlargement is squared or hexagonal in form and has fitting thereon a suitable hand wheel 36 to facilitate rotation of the sleeve. The enlargement also provides a stuffing box in which packing 37 may be compressed by a gland 38.

The above described construction provides for keeping the orifice plate under complete control during its movement. In moving the orifice plate 20 from the bore 12 to the chamber 25, the sleeve 33 is continually rotated by the hand wheel 36. The threads on the sleeve are preferably coarse threads of fairly steep pitch and may be plural threads if found desirable. By the above described construction it will be appreciated that forces exerted on the orifice plate by pressure of gas within the bore 12 will be counteracted and controlled by the threaded sleeve so that the orifice plate will not be shot into the chamber and the positioning rod 32 moved so fast as to injure the operator. Not only does the sleeve construction keep the orifice plate under control but it affords a mechanism giving considerable mechanical advantage in moving the orifice plate from the chamber to the bore 12 against high pressures which may be in the bore. When the orifice plate has been moved into the chamber, the chamber is closed off from the bore by rotating the plug cock or valve closure 23 and after the chamber has been thus closed off, the pressure within the chamber is reduced to atmospheric pressure by opening the stop cock 39.

When orifice fittings of this kind are used on pipe lines containing gases under high pressures, it is highly essential that the bore 12 be perfectly closed off from the chamber 25 while the orifice plate is being detached from the positioning rod 32 and being substituted for. To accomplish this the plug cock 23 has formed on its cylindrical surface a plurality of connected grooves 40. These grooves completely surround an area 41, which is positioned over the entrance to the chamber 25. The grooves 40 are connected by ports 42 to a central bore 43 formed in the stem 26 and in the center of the plug cock. The entrance to the bore 43 is enlarged and internally threaded, as indicated at 44, to receive the seat 45 for a spring actuated ball check valve 46. This enlarged entrance is adapted to receive a screw 47. Grease or other heavy fluid can be placed in the entrance 44 and forced into the bore 43, past the ball check valve by the screw 47. This grease or other fluid passes outwardly through the ports 42, filling the grooves 40 surrounding the area 41. The function of the grease thus supplied to the grooves 40 is three-fold. It lubricates the valve or plug cock 23 to facilitate its being rotated thereafter; it forces the plug cock downwardly; and finally it forms a liquid seal surrounding the entrance to the chamber 25 so that if any gas should leak between the plug cock 23 and the body it could not pass into the chamber because of the presence of the grease in the grooves.

It will be noted that by virtue of the fact that the axis of the plug cock 23 is off-set from the bisection 13 and that the plug cock has a side removed instead of having a diametrical passage therethrough, that when the plug cock is in closed position both the entrance to the bisection and the entrance to the chamber are closed by the plug cock, consequently when the grooves 40 are filled with grease under pressure, the plug cock is urged downwardly tightly toward the entrance to the bisection to effectively close off the bore 12. At the same time if any leakage should occur around the plug cock, it is effectively prevented by the grease seal from passing into the chamber 25.

The bottom of the body may be provided with a jack screw 48, held in place by a jam nut 49. This jack screw is located immediately below the orifice plate and is intended to be used in the event that the orifice plate becomes firmly stuck or frozen in place. This sometimes happens so that it is impossible to withdraw the orifice plate without danger of stripping the threads on the bottom of rod 32. If such is the case, the jam nut 49 is loosened and the jack screw turned to force the orifice plate upwardly and break it loose, after which the orifice plate can be transferred to the chamber, as previously described. Suitable clean out openings 50 may be formed in the sides of the body, which are normally closed by clean out plugs 51. These may be employed in cleaning out débris and sediment which may collect in the body below the bottom of the orifice plate.

From the above described construction it will be appreciated that a new orifice fitting is produced having several important advantages in its construction, making the improved orifice fitting suitable for use in pipe lines conveying gases under high pressures.

Various changes may be made in the details of construction without departing from the spirit or scope of the invention as defined by the appended claims.

We claim:

1. In an orifice fitting, a body having a transversely bisected bore, an orifice plate removably positioned in the bisection, and means having a threaded connection with said body and a swiveled connection with said orifice plate for positioning the orifice plate in the bisection and removing it therefrom.

2. In an orifice fitting, a body having a transversely bisected bore, a laterally accessible chamber, an orifice plate adapted to be positioned in the bisection or removed therefrom into the chamber, means for shutting off the chamber from the bisection, and means for moving the orifice plate from the bisection into the chamber or in the opposite direction, said means being so constructed as to resist movements of the orifice plate under the influence of pressures in the body and thus keep the orifice plate under control during its movement.

3. In an orifice fitting, a body having a transversely bisected bore, a laterally accessible chamber, an orifice plate adapted to be positioned in the bisection or removed therefrom into the chamber, means for shutting off the chamber from the bisection, and a threaded member having a threaded connection with the body and a swiveled connection with the orifice plate for moving the orifice plate from the bisection to the chamber or in the opposite direction.

4. In an orifice fitting, a body having a transversely bisected bore, a laterally accessible chamber, an orifice plate adapted to be positioned in the bisection or removed therefrom into the chamber, means for shutting off the chamber from the bisection, and rotatable threaded means operable by rotation to move the orifice plate from the bisection into the chamber or in the opposite direction.

5. In an orifice fitting, a body having a transversely bisected bore, a laterally accessible chamber, an orifice plate adapted to be positioned in the bisection or removed therefrom into the chamber, means for shutting off the chamber from the bisection, and threaded means operable by rotation to move the orifice plate from the bisection into the chamber or in the opposite direction, said threaded means having a swiveled connection with the orifice plate being operable throughout the entire movement of the orifice plate.

6. In an orifice fitting, a body having a transversely bisected bore, an orifice plate removably positioned in the bisection, and threaded means having its threads rotatably operable to position the orifice plate in the bisection or to remove it therefrom, said threaded means being detachably secured to the orifice plate.

7. In an orifice fitting, a body having a transversely bisected bore, an orifice plate removably positioned in the bisection, and threaded means having its threads operable to position the orifice plate in the bisection or to remove it therefrom, said threaded means having a detachable and swiveled connection with the orifice plate.

8. In an orifice fitting, a body having a transversely bisected bore, an orifice plate removably positioned in the bisection, a laterally accessible chamber, means for closing off the chamber from the bore, and threaded means having its threads rotatably operable to position the orifice plate in the bisection or to remove it therefrom into the chamber, said threaded means being detachably secured to the orifice plate 9. In an orifice fitting, a body having a transversely bisected bore, an orifice plate removably positioned in the bisection, a laterally accessible chamber, means for closing off the chamber from the bore, and threaded means having its threads operable to position the orifice plate in the bisection or to remove it therefrom into the chamber, said threaded means having a detachable and swiveled connection with the orifice plate.

10. In an orifice fitting, a body having a transversely bisected bore, an orifice plate removably positioned in the bisection, a laterally accessible chamber into which the orifice plate may be moved, and means for closing off the chamber from the bore, there being cavities formed between said means and the body which when utilized are on the chamber side of said means, said cavities being adapted to receive a fluid as and for the purpose described.

11. In an orifice fitting, a body having a transversely bisected bore, an orifice plate removably positioned in the bisection, a laterally accessible chamber into which the orifice plate may be moved, a valve closure for closing off the entrance to the chamber from the bore, said valve closure having grooves formed thereon surrounding an area adapted to close the entrance to the chamber when the valve closure is in closed position, there being provision made in the interior of the valve closure for supplying said grooves with a fluid under pressure.

12. In an orifice fitting, a body having a transversely bisected bore, an orifice plate removably positioned in the bisection, a laterally accessible chamber into which the orifice plate may be moved, and a rotatable valve closure for closing off the entrance to the chamber from the bore, said valve closure having grooves formed thereon surrounding an area adapted to close the entrance to the chamber when the valve closure is in closed position, there being provision made in the interior of the valve closure for supplying said grooves with a fluid.

13. In an orifice fitting, a body having a transversely bisected bore, an orifice plate removably positioned in the bisection, a laterally accessible chamber into which the orifice plate may be moved, a rotatable valve closure for closing off the entrance to the chamber from the bore, said valve closure having grooves formed thereon surrounding an area adapted to close the entrance to the chamber when the valve closure is in closed position, there being provision made for supplying said grooves with a fluid, and means on the valve closure for maintaining the fluid in the grooves under pressure.

14. In an orifice fitting, a body having a transversely bisected bore, an orifice plate removably positioned in the bisection, a laterally accessible chamber communicating with the bore, means for closing off the chamber from the bore, a stem secured to the orifice plate and extending through the chamber, and threaded means operable upon the stem to move the orifice plate into the chamber or in the opposite direction.

15. In an orifice fitting, a body having a transversely bisected bore, an orifice plate removably positioned in the bisection, a laterally accessible chamber communicating with the bore, means for closing off the chamber from the bore, a stem secured to the orifice plate and extending through the chamber, and threaded means operable upon the stem to move the orifice plate into the chamber or in the opposite direction, said threaded means having its threads engaging the body otherwise than between opposite walls of the chamber.

16. In an orifice fitting, a body having a transversely bisected bore, an orifice plate removably positioned in the bisection, a laterally accessible chamber communicating with the bore, means for closing off the chamber from the bore, a stem secured to the orifice plate and extending through the chamber, and threaded means operable upon the stem to move the orifice plate into the chamber or in the opposite direction, said threaded means being threaded through a wall of the chamber.

17. In an orifice fitting, a body having a transversely bisected bore, an orifice plate removably positioned in the bisection, a laterally accessible chamber communicating with the bore, means for closing off the chamber from the bore, a stem secured to the orifice plate and extending through the chamber, means for forcing the orifice plate laterally against a side of the bisection to prevent leakage around the orifice plate, and threaded means operable upon the stem to move the orifice plate into the chamber or in the opposite direction, said threaded means permitting such slight lateral movement of the orifice plate while in the bisection.

18. In an orifice fitting, a body having a transversely bisected bore, an orifice plate removably positioned in the bisection, a laterally accessible chamber adapted to communicate with the bore, and means for shutting off the chamber from the bore comprising a valve chamber interposed between the lateral chamber and the bore, there being ports formed in the valve chamber communicating with the lateral chamber and the bore respectively which are arranged on the same side of a diameter of the valve chamber, a rotary valve in the valve chamber having a side removed so as to be capable in one position to establish communication between the ports or in another position to present a substantially solid mass between the ports.

19. In an orifice fitting, a body having a transversely bisected bore, an orifice plate removably positioned in the bisection, a laterally accessible chamber adapted to communicate with the bore, and means for shutting off the chamber from the bore comprising a valve chamber interposed between the lateral chamber and the bore, there being ports formed in the valve chamber communicating with the lateral chamber and the bore respectively which are arranged on the same side of a diameter of the valve chamber, a rotary valve in the valve chamber having a side removed so as to be capable in one position to establish communication between the ports or in another position to present a substantially solid mass between the ports, there being grooves formed on the exterior surface of the valve surrounding the area adapted to close one of the ports, and means for supplying said grooves with a fluid under pressure to prevent leakage.

20. An orifice fitting comprising a body having a transversely bisected bore therethrough, an orifice plate removably positioned in the bisection, a laterally arranged chamber, a valve chamber between the lateral chamber and the bore having ports communicating with the lateral chamber and bore respectively, and a rotatable valve in the valve chamber having its axis of rotation arranged otherwise than between the ports, said valve having a side removed so as to be adapted in one position to open both ports and on being rotated into another position to close both ports and provide a substantially solid mass therebetween.

21. An orifice fitting comprising a body having a transversely bisected bore therethrough, an orifice plate removably positioned in the bisection, a laterally arranged chamber, a valve chamber between the lateral chamber and the bore having ports communicating with the lateral chamber and bore respectively, and a rotatable valve in the valve chamber having its axis of rotation arranged otherwise than between the ports, said valve having a side removed so as to be adapted in one position to open both ports and on being rotated into another position to close both ports and provide a substantially solid mass therebetween, there being grooves surrounding the area on the valve which covers the port to the lateral chamber, and means for supplying a material to the grooves to prevent leakage.

22. In an orifice fitting, a body having a transversely bisected bore, an orifice plate removably positioned in the bisection, a laterally accessible chamber into which the orifice plate may be moved, and a valve closure for closing off the chamber from the bore, said valve closure having grooves formed thereon surrounding an area adapted to close the entrance to the chamber when the valve is in closed position and which when the valve is in closed position are on the chamber side of the valve closure, there being provision made for supplying the grooves with a fluid.

In testimony whereof we have signed our names to this specification.

SOLON B. WELCOME.
OLIVER W. MUFF.

chamber and the bore having ports communicating with the lateral chamber and bore respectively, and a rotatable valve in the valve chamber having its axis of rotation arranged otherwise than between the ports, said valve having a side removed so as to be adapted in one position to open both ports and on being rotated into another position to close both ports and provide a substantially solid mass therebetween, there being grooves surrounding the area on the valve which covers the port to the lateral chamber, and means for supplying a material to the grooves to prevent leakage.

22. In an orifice fitting, a body having a transversely bisected bore, an orifice plate removably positioned in the bisection, a laterally accessible chamber into which the orifice plate may be moved, and a valve closure for closing off the chamber from the bore, said valve closure having grooves formed thereon surrounding an area adapted to close the entrance to the chamber when the valve is in closed position and which when the valve is in closed position are on the chamber side of the valve closure, there being provision made for supplying the grooves with a fluid.

In testimony whereof we have signed our names to this specification.

SOLON B. WELCOME.
OLIVER W. MUFF.

CERTIFICATE OF CORRECTION.

Patent No. 1,792,950.                    Granted February 17, 1931, to

SOLON B. WELCOME ET AL.

It is hereby certified that error appears in the printed specification of the above numbered patent requiring correction as follows: Page 3, strike out lines 19 to 31, comprising claim 2.

The claims now appearing in the patent as numbers 3, 4, 5, 6, 7, 8, 9, 10, 11, 12, 13, 14, 15, 16, 17, 18, 19, 20, 21 and 22, should bear the numbers respectively 2, 3, 4, 5, 6, 7, 8, 9, 10, 11, 12, 13, 14, 15, 16, 17, 18, 19, 20 and 21; and that the said Letters Patent should be read with these corrections therein that the same may conform to the record of the case in the Patent Office.

Signed and sealed this 14th day of July, A. D. 1931.

(Seal)

M. J. Moore,
Acting Commissioner of Patents.

CERTIFICATE OF CORRECTION.

Patent No. 1,792,950.　　　　　　　　　　　Granted February 17, 1931, to

SOLON B. WELCOME ET AL.

It is hereby certified that error appears in the printed specification of the above numbered patent requiring correction as follows: Page 3, strike out lines 19 to 31, comprising claim 2.

The claims now appearing in the patent as numbers 3, 4, 5, 6, 7, 8, 9, 10, 11, 12, 13, 14, 15, 16, 17, 18, 19, 20, 21 and 22, should bear the numbers respectively 2, 3, 4, 5, 6, 7, 8, 9, 10, 11, 12, 13, 14, 15, 16, 17, 18, 19, 20 and 21; and that the said Letters Patent should be read with these corrections therein that the same may conform to the record of the case in the Patent Office.

Signed and sealed this 14th day of July, A. D. 1931.

(Seal)　　　　　　　　　　　　　　　　　M. J. Moore,
　　　　　　　　　　　　　　　　　Acting Commissioner of Patents.